United States Patent Office 3,545,130
Patented Dec. 8, 1970

3,545,130
SOIL CONDITIONING AND EROSION CONTROL
Greene W. Strother, Jr., and William P. Coker, Lake Jackson, Tex., assignors to The Dow Chemical Company, Midland, Mich., a corporation of Delaware
No Drawing. Filed July 21, 1967, Ser. No. 655,006
Int. Cl. A01n 7/02; E02d 3/12
U.S. Cl. 47—58                                10 Claims

ABSTRACT OF THE DISCLOSURE

It has been discovered that combinations of water-soluble polymers which interact in aqueous solution to form a gel can be fluidized and applied to soil to produce excellent erosion control as well as soil conditioning for improved plant life.

---

Numerous chemical treatments for soil have been evolved in recent years. In one line of technology, soil has been consolidated to improve its load bearing qualities and to improve its resistance to erosion. Illustrative of such technology are the inventions disclosed in the patents to Davidson et al., U.S. 2,981,162 and Tousignant et al., U.S. 2,839,417. In another development crosslinked polymers are polymerized in situ within the soil. This art is illustrated by the teachings of Falvey, U.S. 3,208,226, Rakowitz, U.S. 3,021,298 and Morgan et al., U.S. 2,-801,984.

In addition to soil stabilization or consolidation to improve strength properties, soils have been conditioned for improved agronomic practices and for reduced erosion by the incorporation of water-soluble polyelectrolytes. Such are the objects of Mowry et al. in U.S. 2,625,529 and Hedrick et al. in U.S. 2,651,885 and 2,652,379.

In the instant invention, the concern is to minimize erosion by wind and water and yet provide a soil bed suitable for plant life. The degree of erosion control achieved with the soil conditioning (as contrasted with soil consolidating) treatments of the prior art is frequently not sufficient for many applications. One such application is the stabilization of highway embankments until plant growth is established.

Accordingly, it would be desirable, and it is among the objects of the instant invention to provide an improved method for stabilizing soil against erosion, while improving its tilth for plant growth. Especially, it is an object to impart to the soil an improved resistance to erosion with a gellable polymer combination. The foregoing objects, and other benefits as will become apparent hereinafter, are achieved in the instant invention.

In accordance with the instant invention, an improved process for soil stabilization against erosion and conditioning for plant life comprises applying to the soil a fluid aqueous sol of a gellable combination of polymers. The useful gellable combinations of polymers are mixtures of anionic and cationic water soluble polymers which interact, at a concentration of 1 percent by weight total polymer solids in water, to produce a gel at a pH within the range from about 4 to about 9. By the term "gel" is meant a solution of significantly enhanced viscosity as compared to the viscosities of 1 percent by weight aqueous solutions of the individual polymers. These gels may vary from a sticky or slimy pultaceous consistency to a more firm or rubbery gel. The gel interaction products are to be distinguished from the precipitate or particulate interaction products of ionic polymers.

As will be recognized by those skilled in the art, the formation of gellable combinations depends in part upon the composition of the particular anionic and cationic polymers and the ratio of these two polymers in solution. Only certain ratios will produce a gel. Generally, these ratios occur when one of the ionic species is in stoichiometric excess of the other, that is, there is an excess of anionic or cationic charges in the combination.

Having determined under the above defined criterion a suitable combination of anionic and cationic polymers, a fluid system for convenient application is prepared by incorporating into an aqueous sol of the polymers a gel repressing reagent. For instance, gel formation may be suitably repressed by incorporating acid or alkali to lower or raise the pH to a level at which the gel is effectively inhibited. Water soluble inorganic salts, preferably salts which perform a fertilizing function in soil, can be incorporated into the aqueous sol as initial viscosity repressing agents. Occasionally it will be desirable to utilize both pH adjustment and salts to fluidize more concentrated solutions of the gellable polymers. With the gel forming tendencies suitably repressed, aqueous sols of the useful polymer combinations can be prepared with total polymer solids as high as 30 percent by weight, based on the weight of the total solution.

Application of the fluid aqueous sol to soil can be by any convenient means. Good results will be achieved by spraying the aqueous sol into the soil. Alternately, the aqueous sol may be applied to the soil simply by plowing, stirring or doctoring the gel into or on the soil surface. For convenience of application it is desirable to dilute the aqueous sol to a polymer solids concentration within the range from about 0.1 to about 2 percent by weight polymer prior to its application. Polymer dosings for effective results will vary somewhat according to the particular system used but some control will usually be achieved by applying about 50 pounds of the polymer combination per acre. Better results will be achieved by using from about 100 to about 200 pounds the polymer gel combination per acre. Up to as much as 500 pounds per acre may be used if desired. The type of soil will determine the loading required for most effective results. For instance, a sandy soil will require higher doses than will a heavy clay soil since there will be more penetration of the soil.

In a special embodiment of the invention, the gellable polymer combination is formed in aqueous ammonia, i.e. ammonium hydroxide. Application of the ammoniated polymer solution achieves fertilization as well as stabilization of the soil.

Gellable polymer combinations useful for the instant invention include the solution interaction products of water-soluble anionic and cationic polyelectrolytes. For the purposes herein, the term "anionic polyelectrolytes" refers to water-soluble polymers containing in and along the polymer chain a plurality of negatively charged hydrophilic moieties. Correspondingly, a cationic polyelectrolyte contains in and along the polymer chain a plurality of positively charged hydrophilic moieties. A water-soluble polymer which has both types of charged moieties, i.e. an ampholyte, may be used in the role of either the cationic or anionic polyelectrolyte.

Illustrative gellable combinations of anionic and cationic polyelectrolytes are listed below by formula and generic designations. In each formula, $x$ and $y$ represent the number of mers in the finished water-soluble polymer. The polymers should have a degree of polymerization of at least about 100. Wherever applicable, the ratio of $y/x$ is greater than about 0.05.

ILLUSTRATIVE GELLABLE COMBINATIONS

| System | Cationic polymer | Anionic polymer |
|---|---|---|
| 1 | $-(CH_2-CH)_x-(CH-\underset{CH_3}{C}H)_y-$ with $CONH_2$ and $COOCH_2CH_2N(Me)(Me)$ substituents<br>Copolymer of acrylamide and dimethylaminoethyl methacrylate. | $-(CH_2-CH)_x-(CH_2-\underset{CH_3}{C}H)_y-$ with $CONH_2$ and $COOH$ substituents<br>Copolymer of acrylamide and methacrylic acid |
| 2 | Same as above | $-(CH_2-CH)_y-$ with $COOH$<br>Polyacrylic acid |
| 3 | do | $-(CH_2-CH)_x-(CH_2-CH_2)_y-$ with $CONH_2$ and $COONa$<br>Partially hydrolyzed polyacrylamide |
| 4 | $-(CH_2-CH_2\underset{H}{N})_y-$<br>Polyethylene polyamine | $-(CH_2-CH_2)_y-$ with phenyl-$SO_3Na$<br>Sodium polystyrene sulfonate |
| 5 | Same as above | $-(CH_2-CH)_x-(CH_2-CH_2)_y-$ with $CONH_2$ and $COONa$<br>Partially hydrolyzed polyacrylamide |
| 6 | $-(CH_2-CH)_x-(CH_2-CH)_y-$ with $CONH_2$ and $CONHCH_2CH_2N(Me)(Me)$<br>Copolymer of acrylamide and dimethylaminoethyl-N-acrylamide | $-(CH_2-CH)_x-(CH_2-CH_2)_y-$ with $CONH_2$ and $COONa$<br>Partially hydrolyzed polyacrylamide |
| 7 | $-(CH_2-CH)_x-(CH_2-CH)_y-$ with $CONH_2$ and $CONHCH_2CH_2N(Me)(Me)$<br>Copolymer of acrylamide and dimethylaminoethyl-N-acrylamide | $-(CH_2-CH)_y-$ with $COONa$<br>Sodium polyacrylate |
| 8 | $-(CH_2-CH_2-\overset{+R(1-4\,C's)}{\underset{R(1-4\,C's)}{N}})_y-$<br>Quaternized polyethylene polyamine | $-(CH_2-CH)_x-(CH_2-CH)_y-$ with $CONH_2$ and $CO_2Na$<br>Partially hydrolyzed polyacrylamide |
| 9 | Same as above | $-(CH_2-CH)_y-$ with $CO_2H$<br>Polyacrylic acid |
| 10 | $-(CH_2-CH_2)_y-$ with $NH_2$<br>Polyvinyl amine | Same as above. |
| 11 | Same as above | $-(CH_2-C)_x-(CH-C)_y-$ with phenyl, $CO_2Na$, $CO_2Na$ |

ILLUSTRATIVE GELLABLE COMBINATIONS—Continued

| System | Cationic polymer | Anionic polymer |
|---|---|---|
| 12 | $-(CH_2-CH_2)_y-$ with pendant phenyl ring bearing $N^+Me_2 \, Cl^-$ (Quaternized polyvinyl pyridine) | Copolymer of styrene and sodium maleate: $-(CH_2-CH_2)_x-(CH_2-CH)_y-$ with $CONH_2$ and $CO_2Na$ |
| 13 | $-(CH_2-CH-CH_2-NH)_y-$ with $CH_2OH$ (Methylol polypropyleneamine) | Partially hydrolyzed polyacrylamide: $-(CH_2-CH)_x-(CH_2-CH_2)_y-$ with $CO_2Na$ |
| 14 | $-(CH_2-CH-O)_y-(CH_2-C-O)_x-$ with $CH-NMe_2$ and $Me$ (Dimethylamino polypropylene oxide) | Copolymer sodium acrylate and ethylene: $-(CH_2-CH)_y-$ with $CO_2H$ |
| 15 | $-(CH_2-CH)_x-(CH_2-CH)_y-$ with imidazoline ring (N=, NH) and $CONH_2$ (Copolymer vinyl imidazoline and acrylamide) | Polyacrylic acid: $-(CH_2-CH)_y-$ with $CH_2H$ |
| 16 | $-(CH_2-CH)_y-$ with imidazoline ring (N=, NH) (Polyvinyl imidazoline) | Polyacrylic acid: $-(CH_2-CH)_x-(CH_2-CH)_y-$ with $CONH_2$ and $CO_2Na$ (Partially hydrolyzed polyacrylamide) |

Generally preferred are combinations of cationic, water-soluble polyalkylene polyamines (included within this class are the structurally similar polyethylenimines and epichlorohydrin condensation products with ammonia and amines as well as the condensation products of dihalo alkanes and water-soluble polyamines) and anionic, water-soluble, carboxylic polymers containing a plurality of —COOM groups along the polymer chain, wherein M may be hydrogen or a water-soluble cation, e.g. an alkali metal or ammonium ion.

Viscosity repressing reagents which may be utilized to maintain aqueous sols of the foregoing combinations of polymers as sprayable or pourable liquids include any of the acids such as sulfuric, phosphoric, hydrochloric acids which may be utilized to acidify the aqueous sol below about pH 4, and thereby fluidize the gellable combinations. Similar fluidization can be achieved by incorporating a base such as an alkali metal or ammonium hydroxide in an amount sufficient to produce at least about pH 9. Alternately, and especially if concentrated aqueous sols, i.e. sols with an excess of about 5 percent by weight dissolved gellable polymer combinations, are to be prepared the viscosity repressing effect may be achieved with the use of inorganic water-soluble salts. Preferably the salts will be of such a chemical nature that they contribute to the fertilizing qualities of the composition. For this reason, phosphates are a preferred salt, but in general any water-soluble salt including the water-soluble alkali metal, alkaline earth metal and transition metal, e.g. halides and salts of the oxy-acids of sulfur and nitrogen can be used as viscosity repressants.

The invention will be more fully understood by reference to the following examples. As used in the examples a "showering" is one washing of a soil sample with one inch of simulated rainfall at a rate of about 8 to 12 inches per hour. The soil test sample is prepared in a 12″ x 12″ x 2″ frame with a screen bottom. Initially the screen is filled with a soil, which for the purposes of the following experiments was a blended mixture of 58% sand, 26.2% silt and 15.8% clay. After the soil is placed in the tray it is wetted with sufficient water to give it a moisture content of about 8%. After conditioning for about one hour, the soil is compacted under pressure of about 1.2 tons per square foot. This degree of compaction is a "normal" firmness. An earthen embankment (that has been allowed to settle and compact naturally) will have about this degree of firmness. The soil is then treated with an aqueous sol of the particular polymer or polymer combination under investigation.

In the following examples, reference will be made to the gel properties of the polymer combinations. As used in this context, the term "gel" refers to a slimy pultaceous composition. "Rubber" or "rubbery" refers to a more bodied gel which is substantially less fluid. The term "no gel" will refer to the fact that essentially no reaction occurred, that is, neither aqueous precipitate or a useful gel was formed. "Precipitate" will refer to the appearance of particulate opaque mass which can be separated from the system by vacuum filtration. Only those systems which form "gels" or "rubbery gels" are included within the invention.

EXAMPLE 1

Soil samples were each treated with gellable combinations of a polyacrylamide (PAAm) sufficiently hydrolyzed to function as an anionic polymer and a cationic polyalkylene polyamine (PAPA) with varying ratios of the two polymers. Each of the treated soil samples was subjected to a number of showers sufficient to remove 200 grams of soil. The erosion results of these operations were compared with the results obtained by utilizing each of the PAAm and PAPA polymers alone. The particular PAAm used was a homopolymer of acrylamide in which about 7 percent of the initially available carboxamide groups had been hydrolyzed to sodium carboxylate groups. The polymer had a molecular weight of greater than about 1 million. PAPA was a water-soluble condensation product of ethylendichloride and a polyalkylene polyamine. The condensation product was characterized by a molecular weight of approximately 100,000.

A concentrated applicating solution of a gellable combination of the above polymers was prepared from 150 grams of a 37% solution of the PAPA and 111 grams of the PAAm. Gel formation was suppressed by mixing 195 grams of ammonium hydrogen phosphate, 120 grams of concentrated phosphoric acid and 225 grams of water with the cationic polymer prior to addition of the PAAm. The resulting solution was a stable, homogeneous, relatively fluid liquid having about 20% by weight active polymer solids with a PAAm/PAPA ratio of about 2:1. It was characterized by a pH of about 6.5. A sufficient amount of this polymer solution was sprayed on a soil test specimen to provide a treatment of about 100 pounds per acre. Thereafter the soil was dried for one hour and subjected to showering as defined above.

In a similar manner, other combinations of the PAAm and PAPA polymers were evaluated for gellability, as hereinabove described, and formulated with the above gel repressing agents for application to soil plots. Control data was obtained for each of the individual polymers used in the gellable system under comparable conditions.

The results of the foregoing operations are set forth in the following Table I.

TABLE I

| | Weight ratio PAAm/PAPA | Gellability | Number showers[1] |
|---|---|---|---|
| Run No.: | | | |
| 1 | 5:1 | Gel | 18 |
| 2 | 2:1 | Gel | 20 |
| 3 | 1:1 | Gel | 11 |
| 4 | 1:2 | No gel | 2 |
| 5 | Controls PAAm | | 5 |
| 6 | PAPA | | 1 |

[1] To remove 200 grams of soil.

EXAMPLE 2

In a manner similar to the procedure of Example 1, a series of gel forming combinations of a polyacrylic acid and several different modified polyalkylene polyamines were used to stabilize several soil samples. The polyacrylic acid (PA) employed was characterized by a moleular weight of about 300,000.

The modified polyalkylene polyamines (MPA) were obtained by reacting the polyalkyleneamine used in Example 1 with varying amounts of sodium-3-hydroxy 2-chloro propane sulfonic acid in the presence of sodium hydroxide sufficient to react stoichiometrically with the sulfonic moiety. After a reaction time of one hour, adequate sulfuric acid is added to neutralize any residual caustic and then ammonium hydroxide is added to form the ammonium salt. Four products were prepared in the foregoing manner using ratios of the chloro-propane sulfonic moiety to $-(CH_2-CH_2-NH)-$ mer unit of 0.5/1 (MPA-1), 0.75/1 (MPA-2) and 1/1 (MPA-3).

Each of the combinations of polyacrylic acid and products MPA-1, MPA-2 and MPA-3 were evaluated at varying polymer weight ratios to determine gellable polymer admixtures in aqueous solution. Applicating solutions of each admixture were then prepared in which enough of the MPA, as a 20.6 percent by weight solution in water, was mixed with ammonium hydroxide and sufficient polyacrylic acid, as a 25% solution in water, to yield a fluid aqueous sol of the polymer combination having about 20 percent by weight polymer solids. The ammonium hydroxide constituted about 16.8 percent by weight of the final composition. For the purposes of application to the soil samples, the above composition was diluted with water to about 0.5 percent polymer solids and applied at a dose rate of 100 pounds per acre.

The results of the foregoing operations are set forth in the following Table II.

TABLE II

| Run No. | Polymer composition | Weight ratio anionic/cationic | Gellability | Number showers[1] |
|---|---|---|---|---|
| 1 | PA | | | 5 |
| 2 | MPA-1 | | | 2 |
| 3 | MPA-2 | | | 1 |
| 4 | MPA-3 | | | 1 |
| 5 | PA/MPA-1 | 1:1 | Rubbery | 11 |
| 6 | PA/MPA-1 | 2:1 | Precipitate | 4 |
| 7 | PA/MPA-1 | 5:1 | Rubbery | 10 |
| 8 | PA/MPA-2 | 1:1 | Particulate | 4 |
| 9 | PA/MPA-2 | 2:1 | Fine precipitate (milky) | 4 |
| 10 | PA/MPA-2 | 5:1 | Rubbery | 17 |
| 11 | PA/MPA-3 | 7:1 | do | 11 |

[1] To remove 200 gms. soil.

The foregoing examples illustrate, in reference to the achieving of good erosion control, the essentiality of the condition that a gellable combination of polymers be used. Where no gel or a precipitate was formed, application of the fluid admixture produced relatively poor stabilization. In some instances the stabilization was even worse than the controls involving the use of the polymers individually.

The data of Table II also illustrate the use of an anionic polyelectrolyte with an ampholyte cationic, i.e. a polymer having both anionic and cationic charges. This data further shows the properties of the polymer combination are highly dependent upon the ratio of polymers employed. A given combination will vary from a precipitate to a rubbery gel depending upon this ratio. In each instance, however, the occurrence of a gellable combination produced the superior stabilization of the soil as represented by the number of showers required to remove 200 grams of soil.

What is claimed is:

1. A method for treating soil which comprises applying to the soil a fluid aqueous sol comprising a gel-repressing amount of a gel repressing reagent of a gellable combination of an anionic, water-soluble polymer and a cationic water-soluble polymer, said gellable combination being defined as a combination of two polymers in a predetermined ratio such that in water solution without said gel repressing reagent, said combination in said ratio, at a total polymer solids concentration of 1 percent and at a pH in the range from about 4 to 9, forms a gel, said aqueous sol being applied in an amount to provide from about 50 to about 500 pounds of total polymer solids per acre of soil treated.

2. The method as in claim 1 wherein the liquid solution is sprayed on the soil.

3. A method as in claim 1 wherein the fluid aqueous sol of the gellable polymer contains ammonium hydroxide as the gel repressing reagent and is characterized by a pH above about 9.

4. A method as in claim 1 wherein the fluid aqueous sol of the gellable polymer combination contains phosphoric acid as the gel repressing reagent and is characterized by a pH of less than about 3.

5. A method as in claim 1 wherein the fluid aqueous sol of the gellable polymer combination contains a viscosity repressing water-soluble salt as the gel repressing reagent.

6. A method as in claim 1 wherein the gellable polymer combination comprises a cationic water-soluble polyalkylene polyamine and an anionic water-soluble carboxylic polymer containing a plurality of —COOM groups along the polymer chain wherein M is hydrogen or a water-soluble cation.

7. A method as in claim 1 wherein the gellable polymer combination comprises a polyethylene polyamine and a partially hydrolyzed polyacrylamide.

8. A method as in claim 1 wherein the gellable polymer combination comprises polyethylene polyamine and a polyacrylic acid.

9. A composition which consists of a fluid aqueous sol comprising water, a gel-repressing amount of a gel repressing reagent and a gellable combination of an anionic, water-soluble polymer and a cationic, water-soluble polymer, said gellable combination consisting of a combination of the two polymers in a predetermined ratio such that in water solution without said gel repressing agent, at a total polymer solids concentration of 1 percent and at a pH in the range of from about 4 to 9, said combination forms a gel.

10. A composition in accordance with claim 9 wherein the cationic water-soluble polymer is a polyalkylene polyamine and the anionic water-soluble polymer is a polyacrylic acid or a partially hydrolyzed polyacrylamide.

References Cited

UNITED STATES PATENTS

| | | | |
|---|---|---|---|
| 2,625,471 | 1/1953 | Mowry et al. | 71—1 |
| 2,652,379 | 9/1953 | Hedrick et al. | 47—9UX |
| 2,754,623 | 7/1956 | Mowry et al. | 47—1 |

ROBERT E. BAGWILL, Primary Examiner

U.S. Cl. X.R.

61—36; 260—41